US011505338B2

(12) United States Patent
Mansour et al.

(10) Patent No.: US 11,505,338 B2
(45) Date of Patent: *Nov. 22, 2022

(54) SYSTEMS AND METHODS FOR LAUNCHING A PLURALITY OF SPACECRAFT

(71) Applicant: The Boeing Company, Chicago, IL (US)

(72) Inventors: Sadek W. Mansour, Torrance, CA (US); Gary E. Lemke, Torrance, CA (US); Jason D. Flathom, Irvine, CA (US); Jeffrey S. Noel, Torrance, CA (US)

(73) Assignee: The Boeing Company, Chicago, IL (US)

( * ) Notice: Subject to any disclaimer, the term of this patent is extended or adjusted under 35 U.S.C. 154(b) by 732 days.

This patent is subject to a terminal disclaimer.

(21) Appl. No.: 16/283,396

(22) Filed: Feb. 22, 2019

(65) Prior Publication Data

US 2020/0270001 A1 Aug. 27, 2020

(51) Int. Cl.
*B64G 1/64* (2006.01)
*B64G 1/00* (2006.01)

(52) U.S. Cl.
CPC ............ *B64G 1/641* (2013.01); *B64G 1/007* (2013.01); *B64G 1/645* (2013.01); *B64G 2001/643* (2013.01)

(58) Field of Classification Search
CPC ........ B64G 1/641; B64G 1/007; B64G 1/645; B64G 2001/643; B64G 1/005; B64G 1/1085

See application file for complete search history.

(56) References Cited

U.S. PATENT DOCUMENTS 3,420,470 A * 1/1969 Meyer ................... B64G 1/641
244/173.3
3,652,042 A * 3/1972 Welther ................... B64G 1/00
244/173.3

(Continued)

FOREIGN PATENT DOCUMENTS

DE 1556822 A1 8/1970
EP 3333086 A1 6/2018

OTHER PUBLICATIONS

Search Report for related European Application No. 20157576.8; report dated Jul. 9, 2020.

(Continued)

*Primary Examiner* — Medhat Badawi
*Assistant Examiner* — Vicente Rodriguez
(74) *Attorney, Agent, or Firm* — Hanley, Flight & Zimmerman

(57) ABSTRACT

Systems and methods for launching a plurality of spacecraft, provided in a stack of spacecraft, from a launch vehicle traveling along an in-track path include releasing, in a first separation event occurring at a first time, a first spacecraft from the stack of spacecraft using a first separation force having a first separation force in-track component along the in-track path. Subsequently, in a second separation event occurring at a second time, a second spacecraft is released from the stack of spacecraft using a second separation force having a second separation force in-track component along the in-track path, wherein the second time occurs a first time delay after the first time. The first and second separation in-track components may be different, such as by varying a magnitude of the separation force or an angle at which the spacecraft is launched.

20 Claims, 4 Drawing Sheets

(56) References Cited

U.S. PATENT DOCUMENTS

| | | | | |
|---|---|---|---|---|
| 3,907,225 | A * | 9/1975 | Welther | B64G 1/1085 |
| | | | | 244/173.3 |
| 4,506,852 | A * | 3/1985 | Adams | B64G 1/14 |
| | | | | 124/16 |
| 5,178,347 | A * | 1/1993 | Johnson | B64G 1/002 |
| | | | | 244/158.5 |
| 5,199,672 | A * | 4/1993 | King | B64G 1/007 |
| | | | | 244/164 |
| 6,776,375 | B1 | 8/2004 | Engelhardt et al. | |
| 9,546,007 | B2 * | 1/2017 | Comtesse | B64G 1/641 |
| 10,829,249 | B2 * | 11/2020 | Amimoto | B64G 1/007 |
| 2018/0111707 | A1 * | 4/2018 | Poncet | B64G 1/641 |
| 2018/0162561 | A1 | 6/2018 | Estevez et al. | |

OTHER PUBLICATIONS

Von Dr. Joachim Fleing, "Satelliten-Ballett per Doppelstart", Funkschau, Weka Fachzeitschriften Verlag, Poing, DE, vol. 65, No. 2, Jan. 8, 1993, pp. 34-36, XP000324701, ISSN: 0016-2841.

* cited by examiner

SYSTEMS AND METHODS FOR LAUNCHING A PLURALITY OF SPACECRAFT

FIELD

The present disclosure generally relates to spacecraft systems and methods, and more particularly to systems and methods for launching multiple spacecraft from a launch vehicle.

BACKGROUND

Unless otherwise indicated herein, the materials described in this section are not prior art to the claims and are not admitted to be prior art by inclusion in this section.

To reduce costs associated with launching multiple spacecraft, such as satellites, into outer space, a single launch vehicle may be used to transport a payload of multiple spacecraft from a planet's surface to outer space. Once the launch vehicle has reached a desired altitude, the multiple spacecraft may be dispensed from the launch vehicle. As the multiple spacecraft are launched into orbit, care must be taken to prevent subsequent collisions between the launched spacecraft.

SUMMARY

In accordance with one aspect of the present disclosure, a method for launching a plurality of spacecraft, provided in a stack of spacecraft, from a launch vehicle traveling along an in-track path includes releasing, in a first separation event occurring at a first time, a first spacecraft from the stack of spacecraft using a first separation force having a first separation force in-track component along the in-track path. Subsequently, in a second separation event occurring at a second time, a second spacecraft is released from the stack of spacecraft using a second separation force having a second separation force in-track component along the in-track path, wherein the second time occurs a first time delay after the first time.

In accordance with another aspect of the present disclosure, a system to launch a plurality of spacecraft from a launch vehicle traveling along an in-track path includes a stack of spacecraft releasably coupled to the launch vehicle, with the stack of spacecraft including at least a first spacecraft releasably coupled to a second spacecraft. A first separation assembly releasably couples the first spacecraft and the second spacecraft. At least one first biasing element is disposed between the first spacecraft and the second spacecraft and is configured to generate a first separation force having a first separation force in-track component along the in-track path. A second separation assembly is associated with the second spacecraft, and at least one second biasing element is associated with the second spacecraft and configured to generate a second separation force having a second separation force in-track component along the in-track path. A stack separation controller is operably coupled to the first separation assembly and the second separation assembly. The stack separation controller is programmed to execute a method, comprising actuating the first separation assembly to release the first spacecraft from the stack of spacecraft during a first separation event occurring at a first time, and actuating the second separation assembly to release the second spacecraft from the stack of spacecraft during a second separation event occurring at a second time, wherein the second time occurs a first time delay after the first time.

In accordance with a further aspect of the present disclosure, a method is provided of launching a plurality of spacecraft provided in a stack of spacecraft from a launch vehicle traveling along an in-track path. The method includes releasing, in a first separation event occurring at a first time, a first spacecraft from the stack of spacecraft using a first separation force having a first separation force in-track component along the in-track path. The method also includes releasing, in a second separation event occurring at a second time, a second spacecraft from the stack of spacecraft using a second separation force having a second separation force in-track component along the in-track path, wherein the second time occurs a first time delay after the first time. Additionally, the method includes releasing, in a third separation event occurring at a third time, a third spacecraft from the stack of spacecraft using a third separation force having a third separation force in-track component along the in-track path, wherein the third time occurs a second time delay after the first time. Still further, the method includes releasing, in a fourth separation event occurring at a fourth time, a fourth spacecraft from the stack of spacecraft using a fourth separation force having a fourth separation force in-track component along the in-track path, wherein the fourth time occurs a third time delay after the first time. Each of the first, second, third and fourth separation force in-track components is different from other of the first, second, third, and fourth separation force in-track components.

The features, functions, and advantages that have been discussed can be achieved independently in various embodiments or may be combined in yet other embodiments further details of which can be seen with reference to the following description and drawings.

Figure 1:
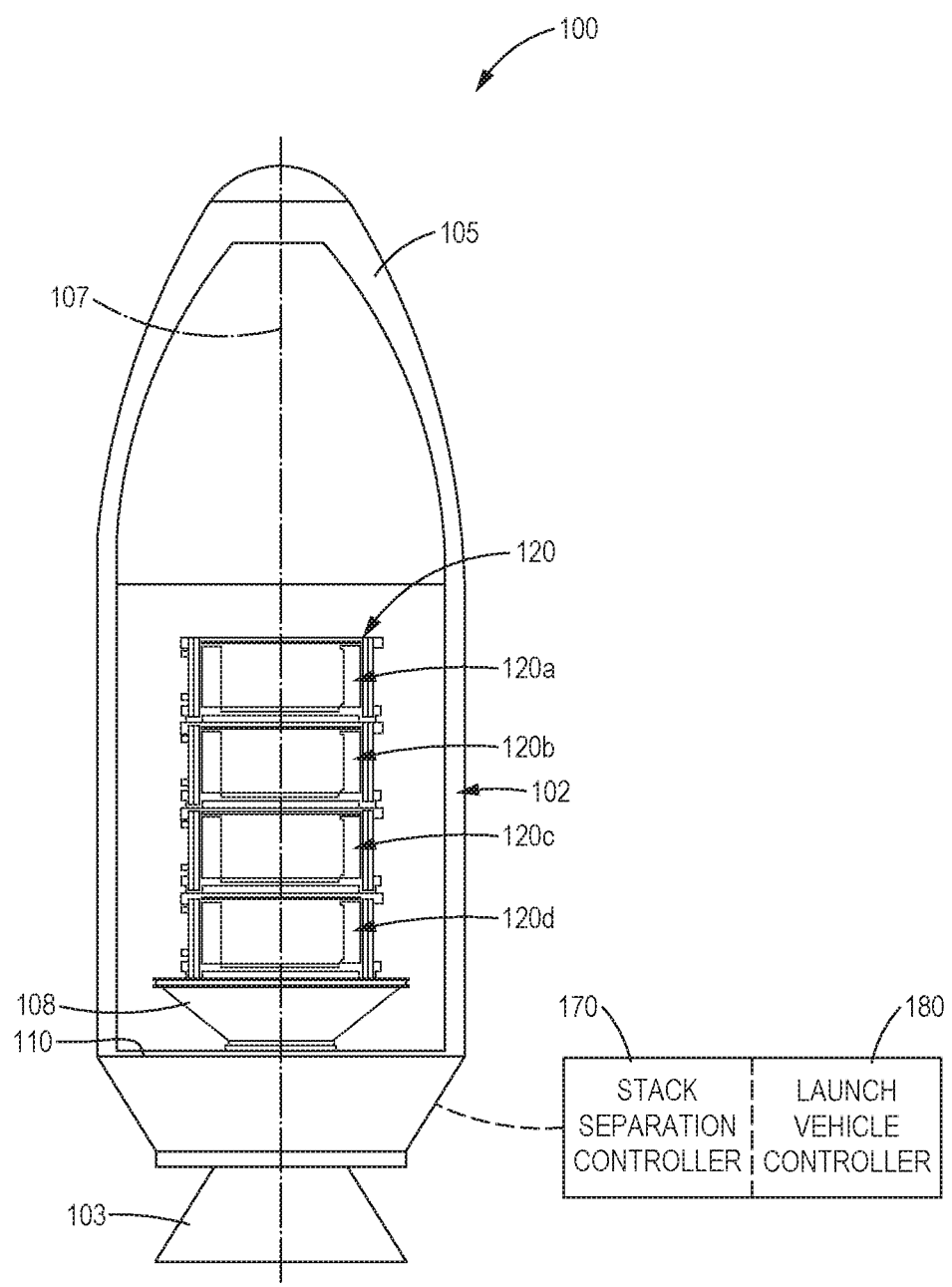
FIG. 1 is a simplified diagram depicting an example of a rocket according to the present disclosure.

It should be understood that the drawings are not necessarily drawn to scale and that the disclosed embodiments are sometimes illustrated schematically. It is to be further appreciated that the following detailed description is merely exemplary in nature and is not intended to limit the disclosure or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

I. Overview

The methods and systems of the present disclosure provide spacecraft systems and methods for deploying multiple spacecraft from a launch vehicle. The spacecraft can be, for example, satellites and/or interplanetary probes. As an example, the launch vehicle can be a rocket for carrying a payload from a planetary surface into outer space.

Within examples, a spacecraft system includes a plurality of spacecraft arranged in a stack. Each of the spacecraft in the stack is releasably coupled to one or more adjacent spacecraft immediately above or below the spacecraft.

The spacecraft system can further include an adaptor that couples the stack of spacecraft to a launch vehicle. The adaptor can have a first end releasably coupled to a bottom-most spacecraft in the stack and a second end configured to couple to a support surface of the launch vehicle. In some instances, the support surface of one type of launch vehicle may differ from the support surface of another type of launch vehicle. To adapt the spacecraft system to a variety of different launch vehicles, a set of adaptors can be provided with a plurality of second end configurations, which respectively correspond to the support surfaces of different types of launch vehicles. As such, the spacecraft system can be readily deployed in a variety of different types of launch vehicles by selecting, from among the set of adaptors, an adaptor corresponding to a particular type of launch vehicle to be used for a particular launch of the spacecraft system.

The spacecraft system can include a plurality of releasable fasteners that releasably couple the spacecraft to the adjacent spacecraft and/or the adaptor. In general, each releasable fastener is actuatable to provide a mechanical release of respective components coupled to one another by the releasable fastener. For example, each releasable fastener can couple respective components of the spacecraft system to each other in a first state of the releasable fastener and release the respective components from each other in a second state of the releasable fastener. Each releasable fastener can be selectively actuated between the first state and the second state responsive to a signal received from a controller.

In one aspect, the controller can transmit signals to the releasable fasteners thereby to release one spacecraft from the stack. In one example, the controller causes the spacecraft to release from the stack, one-by-one, in an order from a top-most spacecraft of the stack to the bottom-most spacecraft of the stack. By the term "top-most spacecraft," it is meant the spacecraft in the stack that is farthest from the support surface of the launch vehicle. By the term "bottom-most spacecraft," it is meant the spacecraft in the stack that is closest to the support surface of the launch vehicle. The spacecraft system can further include a plurality of biasing elements to facilitate separation of the spacecraft from the stack.

Each spacecraft is launched independently from the stack at an associated, unique separation event to ensure safe deployment of the multiple spacecraft. In one example, the separation events are spaced by sufficient periods of time to provide proper spacing between launched spacecraft. In another example, an in-track component of the launch force is different for each separation event. The in-track component of the separation force may be varied by using a different magnitude of separation force during each separation event. Additionally or alternatively, the in-track component of the separation force may be varied by orienting the launch vehicle at a different angle relative to the in-track direction during each separation event.

The spacecraft systems and methods of the present disclosure provide a number of advantages over conventional spacecraft dispensing systems. For example, because the spacecraft are releasably coupled to each other in a stack, the spacecraft system can omit a bulky and heavy structure of conventional dispenser systems. Additionally, by launching individual spacecraft and different times, with different separation forces, and/or at different launch angles, the launched spacecraft will more reliably have sufficient spacing therebetween once placed in orbit.

II. Example Systems

FIG. 1 illustrates a spacecraft system 100 for launching a plurality of spacecraft 120a-d from a launch vehicle 102. The launch vehicle 102 includes a rocket engine to propel the launch vehicle 102 during launch and/or flight. For example, the launch vehicle 102 can include one or more internal fuel chambers containing a rocket fuel (i.e., a propellant), combustion chambers, and/or rocket engine nozzles 103. The combustion chamber can combust the rocket fuel to produce a hot, high pressure gas, which the rocket engine nozzle 103 exhausts away from the launch vehicle 102. The rocket engine nozzle 103 can accelerate the gas received from the combustion chamber to facilitate converting thermal energy of the gas into kinetic energy of the launch vehicle 102. Within examples, the launch vehicle 102 can include a single engine stage or a plurality of engine stages, which separate and ignite in sequence.

The illustrated launch vehicle 102 also includes a fairing 105 to enclose a payload carried by launch vehicle 102, thereby to protect the payload from aerodynamic forces during flight through an atmosphere. The fairing 105 may separate from the launch vehicle 102 after the aerodynamic forces drop below a certain value and/or the launch vehicle 102 reaches a particular location. By separating the fairing 105 from the launch vehicle 102, the payload is exposed to an external environment such as, for example, outer space. The spacecraft system 100 can then deploy into orbit a plurality of spacecraft such as, for example, satellites and/or interplanetary probes, as described below.

Figure 2:
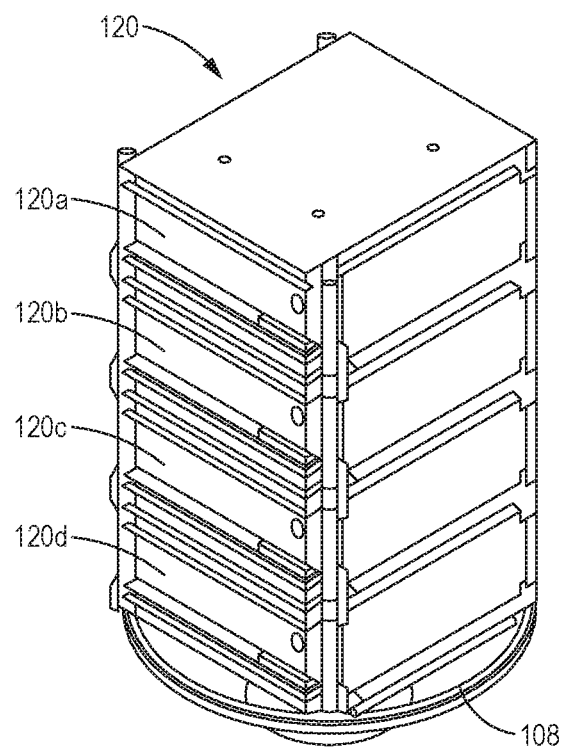
FIG. 2 is a perspective view of an example of a spacecraft system according to the present disclosure.
Figure 3:
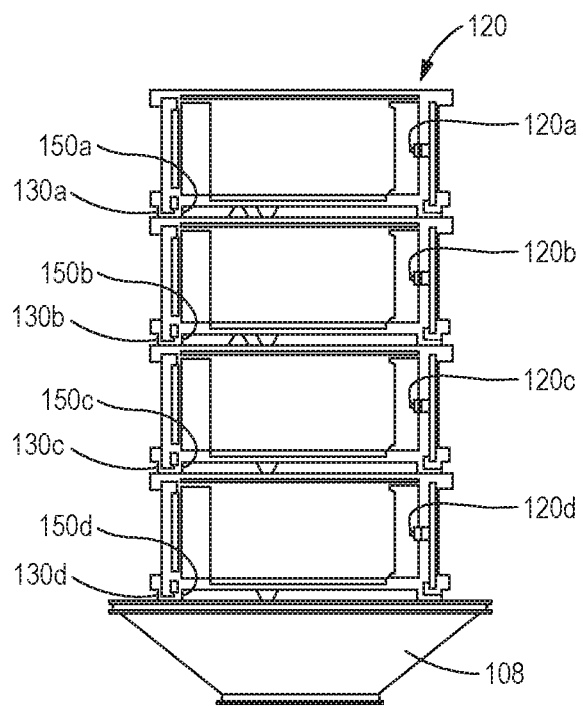
FIG. 3 is a side elevation view of the spacecraft system of FIG. 2.

Referring now to FIGS. 1-3, the payload carried by the launch vehicle 102 is a stack of spacecraft 120. In the illustrated example, stack of spacecraft 120 includes a first spacecraft 120a, a second spacecraft 120b, a third spacecraft 120c, and a fourth spacecraft 120d. While the illustrated example shows four spacecraft, it will be appreciated that the stack of spacecraft 120 may include a quantity of spacecraft that is fewer than or greater than four. While each of the spacecraft 102a-d is depicted as being identical and arranged symmetrically with respect to the other spacecraft in the stack of spacecraft 120, the spacecraft 120a-d need not be identical or arranged symmetrically. The stack of spacecraft 120 is coupled to an adaptor 108, which in turn is coupled to a support surface 110 of the launch vehicle 102.

Each spacecraft 120a-d is releasably coupled to one or more adjacent spacecraft 120a-d in the stack of spacecraft 120 and/or the adaptor 108, to permit each spacecraft 120a-d to be released from the launch vehicle 102 independent of the other spacecraft 120a-d. Accordingly, a first separation assembly 130a is disposed between the first spacecraft 120a and the second spacecraft 120b. Additionally, a second separation assembly 130b is disposed between the second spacecraft 120b and the third spacecraft 120c. Still further, a third separation assembly 130c is disposed between the third spacecraft 120c and the fourth spacecraft 120d. Finally, a fourth separation assembly 130d is disposed between the fourth spacecraft 120d and the adaptor 108. Each of the separation assemblies 130a-d may include a releasable fastener having an coupled state, in which the separation assembly 130a-d mechanically couples each spacecraft 120a-d to adjacent spacecraft 120a-d and/or the adaptor 108, and a released state, in which the previously coupled components are released from each other. The releasable fastener selectively actuates between the coupled state and the released state responsive to a signal received from a stack separation controller 170 operatively coupled (via wired and/or wireless communication) to the releasable fastener.

The stack separation controller 170 can be implemented using hardware, software, and/or firmware. For example, the stack separation controller 170 can include one or more processors and a non-transitory computer readable medium (e.g., volatile and/or non-volatile memory) that stores machine language instructions or other executable instructions. The instructions, when executed by the one or more processors, may cause the stack separation controller 170 to carry out the various operations of the spacecraft system 100 described herein. Within examples, the stack separation controller 170 can be on the launch vehicle 102 and/or at a ground control station.

Examples of releasable fasteners include marman bands, separation nuts, frangible nuts, separation bolts, bolt cutters, wire cutters, cable cutters, split spool devices (e.g., fusible wires and/or shaped-memory alloy wires), solenoid actuated nuts, pin pushers, and/or pin pullers. As further examples, in some implementations, each releasable fastener can include a pyrotechnic charge that can be activated remotely by the stack separation controller 170 to cause the pyrotechnic charge to break the releasable fastener into pieces, thereby releasing the components coupled by the releasable fastener. In other implementations, the releasable fastener can include a non-explosive actuator that can be activated remotely by the stack separation controller 170. The type of releasable fasteners used in the spacecraft system 100 can be determined based on one or more factors including, for example, susceptibility to electromagnetic interference, release response time, release shock, capability to withstand launch loads, capability to sustain preloads, power input to actuate, weight, size, temperature sensitivity, and/or release reliability.

The stack separation controller 170 is configured to transmit signals to selectively actuate the releasable fasteners of each separation assembly 130a-d. For example, the stack separation controller is programmed to cause the spacecraft 120a-d to release, one-by-one, from the stack of spacecraft 120 and the adaptor 108. In one example, the stack separation controller 170 is configured to cause the spacecraft 120a-d to sequentially release in an order from the top-most spacecraft 120a to the bottom most spacecraft 120d. For instance, the stack separation controller 170 may transmit a first separation signal to actuate the releasable fastener of the first separation assembly 130a, thereby to release the first spacecraft 120a from the stack of spacecraft 120. In this manner, the stack separation controller 170 is actuating the first separation assembly 130a to release the first spacecraft 120a from the stack of spacecraft 120 during a first separation event occurring at a first time. The stack separation controller 170 then may transmit a second separation signal to actuate the releasable fastener of the second separation assembly 130b, thereby to release the second spacecraft 120b from the stack of spacecraft 120. In this manner, the stack separation controller 170 is actuating the second separation assembly 130b to release the second spacecraft 120b from the stack of spacecraft 120 during a second separation event occurring at a second time, wherein the second time occurs a first time delay after the first time. Subsequently, the stack separation controller 170 may transmit a third separation signal to actuate the releasable fastener of the third separation assembly 130c, thereby to release the third spacecraft 120c from the stack of spacecraft 120. In this manner, the stack separation controller 170 is actuating the third separation assembly 130c to release the third spacecraft 120c from the stack of spacecraft 120 during a third separation event occurring at a third time, wherein the third time occurs a second time delay after the second time. Still further, the stack separation controller 170 then may transmit a fourth separation signal to actuate the releasable fastener of the fourth separation assembly 130d, thereby to release the fourth spacecraft 120d from the adaptor 108. In this manner, the stack separation controller 170 is actuating the fourth separation assembly 130d to release the fourth spacecraft 120d from the stack of spacecraft 120 during a fourth separation event occurring at a fourth time, wherein the fourth time occurs a third time delay after the second time.

According to the example illustrated in FIGS. 1-3, biasing elements 150a-d are provided to generate a separation force, thereby to ensure separation of respective components of the spacecraft system 100 such as, for instance between adjacent spacecraft 120a-d or between the fourth spacecraft 120d and the adaptor 108. The biasing elements 150a-d apply separation forces between the respective components of the spacecraft system 100 to urge the respective components away from each other. As such, while the releasable fasteners couple the respective components in the coupled state, the separation forces applied by the biasing elements 150a-d preload the releasable fasteners. Then, responsive to the stack separation controller 170 actuating the releasable fasteners from the coupled state to the released state, the separation forces applied to the respective components by the biasing elements 150a-d cause the components to separate from each other. As best shown in FIGS. 2 and 3, one or more first biasing element(s) 150a is disposed between the first spacecraft 120a and the second spacecraft 120b. Additionally, one or more second biasing element(s) 150b is disposed between the second spacecraft 120b and the third spacecraft 120c. Still further, one or more third biasing element(s) 150c is disposed between the third spacecraft 120c and the fourth spacecraft 120d. Finally, one or more fourth biasing element(s) 150d is disposed between the fourth spacecraft 120d and the adaptor 108.

As discussed in greater detail below, each of the biasing elements 150a-d may be configured to generate the same magnitude of separation force. Alternatively, the biasing elements 150a-d may be configured to generate different magnitudes of separation force. In some examples, each of the biasing elements 150a-d may be a passive biasing element, such as a spring or other resilient member. Alternatively, each of the biasing elements 150a-d may be an active biasing element configured to selectively generate the biasing force in response to a biasing signal from the stack separation controller 170. Still further, in the illustrated examples, the biasing elements 150*a-d* may be sized and arranged to direct the separation force substantially along an axis 107 of the launch vehicle 102.

As shown in FIG. 1, the launch vehicle 102 is operatively coupled to a launch vehicle controller 180 configured to control movement of the launch vehicle 102. Once orbiting in outer space, the launch vehicle 102 travels along an in-track path 104. The in-track path 104 may serve as a frame of reference for an orientation of the launch vehicle 102 and an angle at which a separation force is directed. For example, the separation force generated during a separation event can be characterized as having an in-track component, which is the component of the separation force directed along the in-track path 104, and a radial component, which is the component of separation force directed normal to the in-track path 104. Thus, in some applications, the launch vehicle controller 180 is configured to control an orientation of the launch vehicle 102 relative to the in-track path 104, thereby to vary the angle at which a separation force is directed.

In some examples, the launch vehicle controller 180 is integrally provided with the stack separation controller 170. Alternatively, the launch vehicle controller 180 is provided independent of the stack separation controller 170. Accordingly, the launch vehicle controller 180 can be implemented using hardware, software, and/or firmware. For example, the launch vehicle controller 180 can include one or more processors and a non-transitory computer readable medium (e.g., volatile and/or non-volatile memory) that stores machine language instructions or other executable instructions. The instructions, when executed by the one or more processors, may cause the launch vehicle controller 180 to carry out the various operations of the spacecraft system 100 described herein. Within examples, the launch vehicle controller 180 can be on the launch vehicle 102 and/or at a ground control station.

In addition to the features shown in FIG. 1, the launch vehicle 102 can include additional or alternative features such as, for example, one or more navigation and/or guidance systems (e.g., a satellite navigation system and/or an inertial navigation system), and/or stabilization devices (e.g., one or more fins, Vernier engines, gimbals, and/or gyroscopes).

III. Example Operations

Figure 4:
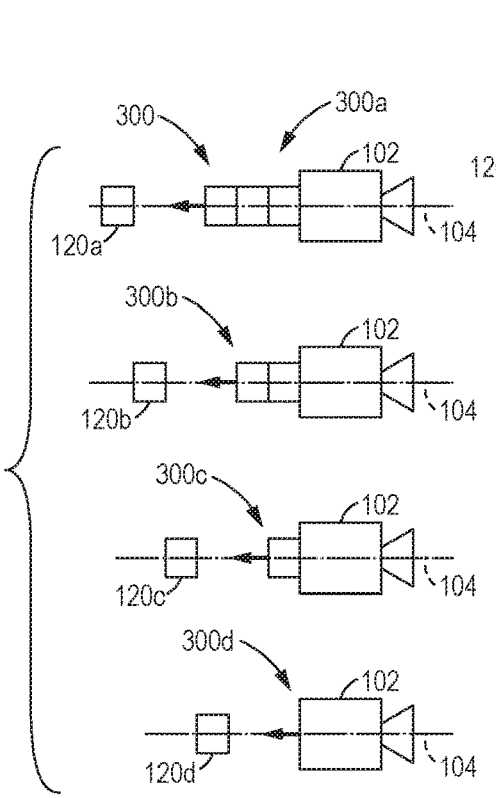
FIG. 4 is a simplified diagram depicting a first method of launching multiple spacecraft according to the present disclosure.

According to certain aspects of this disclosure, the in-track component of the separation force used during each separation event may be varied to more reliably create space between launched spacecraft. In some applications, the in-track component of the separation force is varied by using different magnitudes of separation force. FIG. 4 illustrates a first method 300 of launching multiple spacecraft 120*a-d* provided in a stack of spacecraft 120 from a launch vehicle 102. In this method 300, each spacecraft 102*a-d* is deployed with a different magnitude of separation force. The method 300 includes a first separation event 300*a*, in which the first spacecraft 120*a* is deployed from the launch vehicle 102 with a first separation force having a magnitude, such as 4(x), where x represents a force value. The method 300 continues with a second separation event 300*b*, during which the second spacecraft 120*b* is deployed with a second separation force having a magnitude that is less than the first separation force, such as 3(x). The method later continues with a third separation event 300*c*, during which the third spacecraft 120*c* is deployed with a third separation force having a magnitude that is less than the second separation force, such as 2(x). Finally, the method 300 includes a fourth separation event 300*d*, in which the fourth spacecraft 120*d* is deployed using a fourth separation force having a magnitude that is less than the third separation force, such as 1(x). In this example, therefore, the different magnitudes of separation forces create different in-track components of those forces, thereby increasing the in-track distance between the launched spacecraft 120*a-d*.

Figure 5:
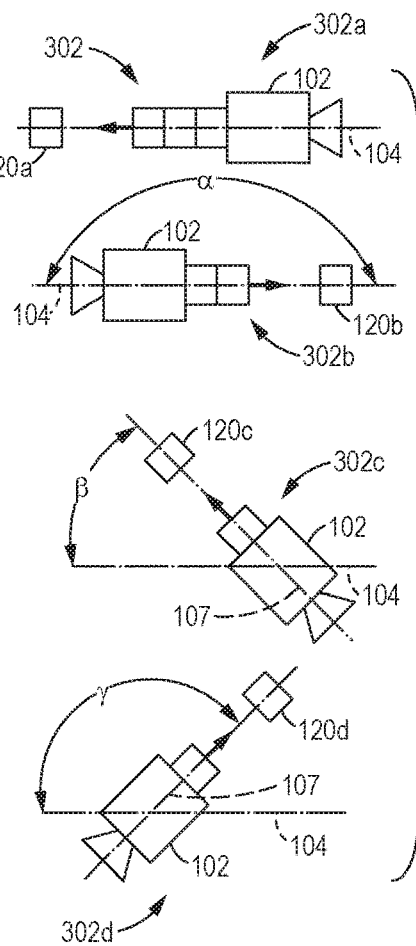
FIG. 5 is a simplified diagram depicting a second method of launching multiple spacecraft according to the present disclosure.

In other examples, the in-track component of the separation force is varied by changing the angle at which the separation force is directed during each separation event. In these examples, the launch vehicle controller 180 changes an orientation of the launch vehicle 102 relative to the in-track path 104, thereby to change the angle at which the separation force is directed. FIG. 5 illustrates a second method 302 of launching multiple spacecraft 120*a-d* provided in a stack of spacecraft 120 from a launch vehicle 102. In this method 302, each spacecraft 102*a-d* is deployed at a different launch angle. The method 302 includes a first separation event 302*a*, in which the first spacecraft 120*a* is deployed from the launch vehicle 102 at a first launch angle that is coincident with the in-track path 104 (i.e., a launch angle of 0°). In this manner, the launch vehicle 102 is oriented in a forward direction along the in-track path 104 during the first separation event 302*a*. Subsequently, the method 302 includes a second separation event 302*b*, during which the second spacecraft 120*b* is deployed at a second launch angle, wherein the launch vehicle 102 is oriented in a first rotated direction angularly offset from the forward direction along the in-track path 104 by a first rotation angle $\alpha$. In this manner, the launch vehicle 102 is oriented in a first rotated direction angularly offset from the forward direction along the in-track path 104 by a first rotation angle $\alpha$ during the second separation event 302*b*. The method 302 later continues with a third separation event 302*c*, in which the third spacecraft 120*c* is deployed at a third launch angle, wherein the launch vehicle 102 is oriented in a second rotated direction angularly offset from the forward direction along the in-track path 104 by a second rotation angle $\beta$. In this manner, the launch vehicle 201 is oreinted in a second rotated direction angularly offset from the forward direction by a second rotation angle $\beta$ during the third separation event 302*c*, wherein the second rotation angle $\beta$ is different from the first rotation angle $\alpha$. Finally, the method 302 includes a fourth separation event 302*d*, in which the fourth spacecraft 120*d* is deployed at a fourth launch angle, wherein the launch vehicle 102 is oriented in a third rotated direction angularly offset from the forward direction along the in-track path 104 by a third rotation angle $\gamma$. In this manner, the launch vehicle 102 is oriented in a third rotated direction angularly offset from the forward direction by a third rotation angle $\gamma$ during the fourth separation event 302*d*. As illustrated in FIG. 5, the first rotation angle $\alpha$ is 180°, the second rotation angle $\beta$ is 60°, and the third rotation angle $\gamma$ is 120°, however it will be appreciated that other rotation angles may be used. Furthermore, during the first separation event 302*a*, the launch vehicle 102 need not be oriented in the forward direction of the in-line path 104 as shown, but instead may be oriented at a rotated direction.

In the method 302 of FIG. 5, with the rotation angle measured relative to the forward direction along the in-track path 104, it will be appreciated that the in-track component of the separation force is equal to the magnitude of the separation force times the cosine of the rotation angle. Accordingly, even if the separation force for each separation event has the same magnitude, the in-track component of that force will vary according to the rotation angle. Using the exemplary rotation angles identified above, therefore, in the method 302 the first separation force will have an in-track component of 1(x), the second separation force will have an in-track component of −1(x), the third separation force will have an in-track component of 0.5(x), and the fourth separation force will have an in-track component of −0.5(x), thereby increasing the in-track distance between launched spacecraft 120a-d.

Figure 6:
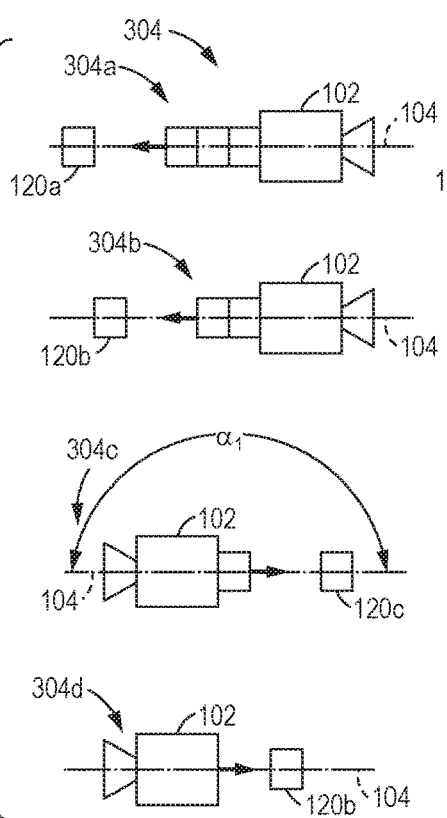
FIG. 6 is a simplified diagram depicting a third method of launching multiple spacecraft according to the present disclosure.

Still further, both the magnitude and the launch angle may be varied between separation events to create space between launched spacecraft. FIG. 6 illustrates a third method 304 of launching multiple spacecraft 120a-d provided in a stack of spacecraft 120 from a launch vehicle 102. In this method 304, both the launch angle and the magnitude of the separation force are varied between separation events. More specifically, the method 304 includes a first separation event 304a, where the first spacecraft 120a is deployed with a first separation force having a magnitude, such as 2(x), and a launch angle that is aligned with the in-track path 104. Subsequently, the method 304 continues with a second separation event 304b, in which the second spacecraft 120b is deployed with a second separation force having a smaller magnitude, such as 1(x), while the launch angle is still aligned with the in-track path 104. The method 304 later continues with a third separation event 304c, in which the third spacecraft 120c is deployed using a third separation force that has the smaller magnitude, such as 1(x), and the launch vehicle 102 oriented in a first rotated direction angularly offset from the forward direction along the in-track path 104 by a first rotation angle α1. Finally, the method 304 includes a fourth separation event 304d, during which the fourth spacecraft 120d is deployed using a fourth separation force having a larger magnitude, such as 2(x), and the launch vehicle 102 still oriented in the first rotated direction at the first rotation angle α1. In this method 304, the use of only two different separation force magnitudes and only two different launch angles is merely exemplary, as each separation event may have a unique separation force and launch angle without departing from this disclosure.

Figure 7:
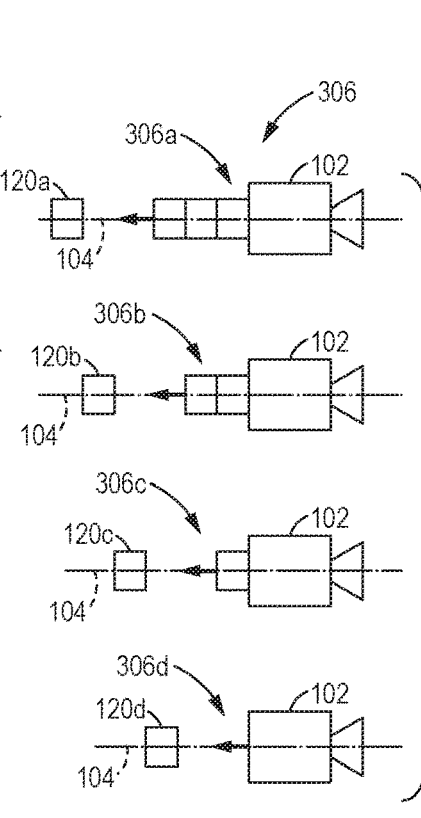
FIG. 7 is a simplified diagram depicting a fourth method of launching multiple spacecraft according to the present disclosure.

In a fourth method 306 illustrated at FIG. 7, the timing between separation events is used to create sufficient in-track space between launched spacecraft. The method 306 begins with a first separation event 306a at a first time, during which the first spacecraft 120a is deployed using a first separation force with the launch vehicle 102 oriented in alignment with the forward direction along the in-track path 104. Subsequently, the method 306 includes a second separation event 306b occurring at a second time that is a first time delay after the first time, in which the second spacecraft 120b is deployed using a second separation force with the launch vehicle 102 still aligned with the forward direction along the in-track path 104. The method 306 later includes a third separation event 306c occurring at a third time that is a second time delay after the first time, during which the third spacecraft 120c is deployed using a third separation force, with the launch vehicle again aligned in the forward direction along the in-track path 104. Finally, the method includes a fourth separation event 306d occurring at a fourth time that is a third time delay after the first time, in which the fourth spacecraft 120d is deployed using a fourth separation force, again with the launch vehicle 102 oriented in the forward direction along the in-track path 104. In this example, each of the first through fourth separation forces may be substantially equal, and therefore the time delays between separation events is used to create sufficient distance between launched spacecraft 120a-d.

While each of the above methods 300, 302, 304, and 306 is shown having four separation events, it will be appreciated that greater or fewer than four separation events may be used. Additionally, while the methods 300, 302, 304, and 306 may primarily rely on one variable, such as time, magnitude of separation force, or launch angle, to create distance between the launched spacecraft, any combination of these variables may be employed without departing from the scope of this disclosure.

Figure 8:
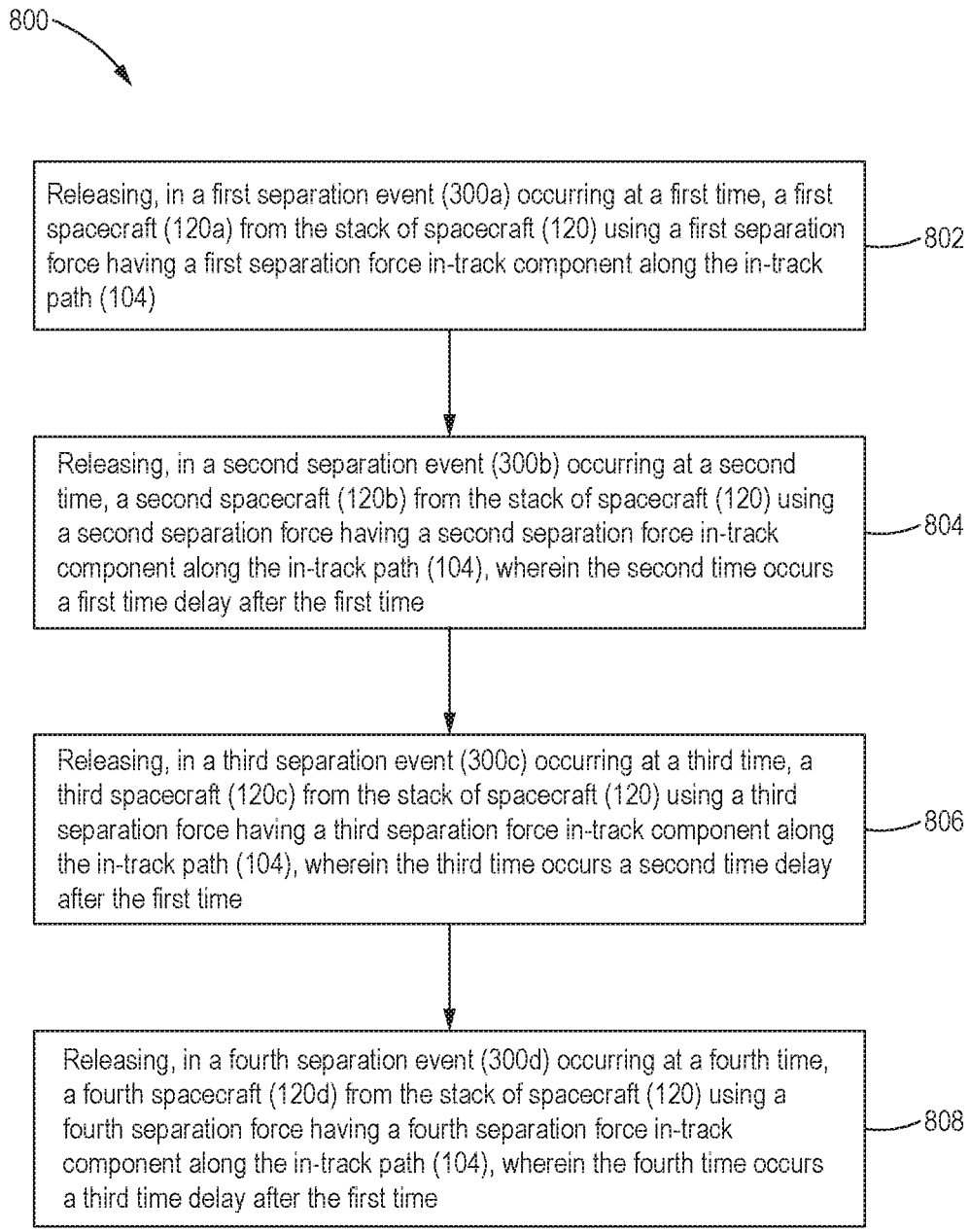
FIG. 8 is a flow chart illustrating one or more methods according to the present disclosure.

According to the flow chart presented as FIG. 8, a method 800 of launching a plurality of spacecraft provided in a stack of spacecraft 120 from a launch vehicle 102 traveling along an in-track path 104 includes releasing 802, in a first separation event 300a, 302a, 304a, or 306a occurring at a first time, a first spacecraft 120a from the stack of spacecraft 120 using a first separation force having a first separation force in-track component along the in-track path 104. The method 800 further includes releasing 804, in a second separation event 300b, 302b, 304b, or 306b occurring at a second time, a second spacecraft from the stack of spacecraft using a second separation force having a second separation force in-track component along the in-track path, wherein the second time occurs a first time delay after the first time. Optionally, the method 800 may continue by releasing 806, in a third separation event 300c, 302c, 304c, or 306c occurring at a third time, a third spacecraft from the stack of spacecraft using a third separation force having a third separation force in-track component along the in-track path, wherein the third time occurs a second time delay after the first time. Still further, the method 800 may further include releasing 808, in a fourth separation event 300d, 302d, 304d, or 306d occurring at a fourth time, a fourth spacecraft from the stack of spacecraft using a fourth separation force having a fourth separation force in-track component along the in-track path, wherein the fourth time occurs a third time delay after the first time. Each of the first, second, third and fourth separation force in-track components is different from other of the first, second, third, and fourth separation force in-track components.

Example aspects have been described above. After studying the configurations, examples, and arrangements described herein a skilled person may come to understand, however, that changes and modifications may be made without departing from the true scope and spirit of the disclosure. The description of the different advantageous aspects has been presented for purposes of illustration and description, and is not intended to be exhaustive or limited to the form disclosed. After reviewing this disclosure, many modifications and variations will become apparent to those of ordinary skill in the art. Further, different advantageous aspects may provide different advantages as compared to other advantageous aspects. The example aspects selected are chosen and described in order to explain the principles of the disclosure, the practical application, and to enable others of ordinary skill in the art to understand the disclosure with various modifications as are suited to the particular use contemplated.

What is claimed is:

1. A method of launching a plurality of spacecraft provided in a stack of spacecraft from a launch vehicle, the launch vehicle traveling along an in-track path, the method comprising:

actuating at least one first biasing element to generate a first separation force having a first separation force in-track component along the in-track path, the plurality of the spacecraft including a first spacecraft and a second spacecraft, the at least one first biasing element disposed between the first spacecraft and the second spacecraft;

releasing, in a first separation event occurring at a first time, the first spacecraft from the stack of spacecraft using the first separation force;

actuating at least one second biasing element to generate a second separation force having a second separation force in-track component along the in-track path, the at least one second biasing element associated with the second spacecraft, the second separation force different from the first separation force, the second separation force in-track component different from the first separation force in-track component; and releasing, in a second separation event at a second time after the first time, the second spacecraft from the stack of spacecraft using the second separation force.

2. The method of claim 1, wherein the first separation force in-track component is less than the second separation force in-track component.

3. The method of claim 1, wherein the first separation force in-track component is greater than the second separation force in-track component.

4. The method of claim 3, wherein a first magnitude of the first separation force is greater than a second magnitude of the second separation force.

5. The method of claim 3, wherein:
the launch vehicle is oriented in a forward direction along the in-track path during the first separation event; and
the launch vehicle is oriented in a first rotated direction angularly offset from the forward direction along the in-track path by a first rotation angle during the second separation event.

6. The method of claim 5, wherein the first rotation angle is 180 degrees.

7. The method of claim 5, wherein the first rotation angle is 60 degrees.

8. The method of claim 1, wherein the plurality of the spacecraft include a third spacecraft, and further including:
releasing, in a third separation event at a third time after the second time, the third spacecraft from the stack of spacecraft using a third separation force having a third separation force in-track component along the in-track path.

9. The method of claim 8, wherein the first separation force in-track component is greater than the second separation force in-track component, and the second separation force in-track component is greater than the third separation force in-track component.

10. The method of claim 9, wherein:
the launch vehicle is oriented in a forward direction along the in-track path during the first separation event;
the launch vehicle is maintained in the forward direction along the in-track path during the second separation event; and
the launch vehicle is oriented in a first rotated direction angularly offset from the forward direction by a first rotation angle during the third separation event.

11. The method of claim 9, wherein:
during the first separation event, the launch vehicle is oriented in a forward direction along the in-track path;
during the second separation event, the launch vehicle is oriented in a first rotated direction angularly offset from the forward direction by a first rotation angle; and
during the third separation event, the launch vehicle is oriented in a second rotated direction angularly offset from the forward direction by a second rotation angle, wherein the second rotation angle is different from the first rotation angle.

12. A system to launch a plurality of spacecraft from a launch vehicle traveling along an in-track path, the system comprising:
a stack of spacecraft releasably coupled to the launch vehicle, the stack of spacecraft including at least a first spacecraft releasably coupled to a second spacecraft;
a first separation assembly releasably coupling the first spacecraft and the second spacecraft;
at least one first biasing element disposed between the first spacecraft and the second spacecraft;
a second separation assembly associated with the second spacecraft;
at least one second biasing element associated with the second spacecraft; and
a stack separation controller to:
actuate the at least one first biasing element to generate a first separation force having a first separation force in-track component along the in-track path;
actuate the first separation assembly to release the first spacecraft from the stack of spacecraft during a first separation event at a first time;
actuate the at least one second biasing element to generate a second separation force having a second separation force in-track component along the in-track path, the second separation force different from the first separation force, the second separation force in-track component different from the first separation force in-track component and
actuate the second separation assembly to release the second spacecraft from the stack of spacecraft during a second separation event at a second time after the first time.

13. The system of claim 12, wherein the first separation force in-track component generated by the at least one first biasing element is greater than the second separation force in-track component generated by the at least one second biasing element.

14. The system of claim 13, wherein a first magnitude of the first separation force generated by the at least one first biasing element is greater than a second magnitude of the second separation force generated by the at least one second biasing element.

15. The system of claim 13, further including a launch vehicle controller to:
control the launch vehicle to be oriented in a forward direction along the in-track path during the first separation event; and
control the launch vehicle to be oriented in a first rotated direction angularly offset from the forward direction by a first rotation angle during the second separation event.

16. The system of claim 12, wherein:
the stack of spacecraft further includes a third spacecraft releasably coupled to the second spacecraft;
the second biasing element is disposed between the second spacecraft and the third spacecraft;
a third separation assembly is associated with the third spacecraft;
at least one third biasing element is associated with the third spacecraft; and
the stack separation controller is to:
actuate the at least one third biasing element to generate a third separation force having a third separation force in-track component along the in-track path; and actuate the third separation assembly to release the third spacecraft from the stack of spacecraft during a third separation event at a third time after the second time.

17. The system of claim 16, wherein the first separation force in-track component generated by the at least one first biasing element is greater than the second separation force in-track component generated by the at least one second biasing element, and the second separation force in-track component generated by the at least one second biasing element is greater than the third separation force in-track component generated by the at least one third biasing element.

18. The system of claim 17, further including a launch vehicle controller to:
    control the launch vehicle to be oriented in a forward direction along the in-track path during the first separation event;
    control the launch vehicle to be maintained in the forward direction along the in-track path during the second separation event; and
    control the launch vehicle to be oriented in a first rotated direction angularly offset from the forward direction of the in-track path by a first rotation angle during the third separation event.

19. The system of claim 17, further including a launch vehicle controller to:
    control the launch vehicle to be oriented in a forward direction along the in-track path during the first separation event;
    control the launch vehicle to be oriented in a first rotated direction angularly offset from the forward direction by a first rotation angle during the second separation event; and
    control the launch vehicle to be oriented in a second rotated direction angularly offset from the forward direction by a second rotation angle during the third separation event, wherein the second rotation angle is different from the first rotation angle.

20. A method of launching a plurality of spacecraft provided in a stack of spacecraft from a launch vehicle, the launch vehicle traveling along an in-track path, the method comprising:
    in response to actuating at least one first biasing element to generate a first separation force having a first separation force in-track component along the in-track path, releasing, in a first separation event occurring at a first time, a first spacecraft from the stack of spacecraft based on the first separation force, the plurality of the spacecraft including the first spacecraft, a second spacecraft, a third spacecraft, and a fourth spacecraft, the at least one first biasing element disposed between the first spacecraft and the second spacecraft;
    in response to actuating at least one second biasing element to generate a second separation force having a second separation force in-track component along the in-track path, releasing, in a second separation event occurring at a second time after the first time, the second spacecraft from the stack of spacecraft based on the second separation force, the at least one second biasing element disposed between the second spacecraft and the third spacecraft;
    in response to actuating at least one third biasing element to generate a third separation force having a third separation force in-track component along the in-track path, releasing, in a third separation event occurring at a third time after the second time, the third spacecraft from the stack of spacecraft based on the third separation force; and
    in response to actuating at least one fourth biasing element to generate a fourth separation force having a fourth separation force in-track component along the in-track path, releasing, in a fourth separation event occurring at a fourth time after the third time, the fourth spacecraft from the stack of spacecraft based on the fourth separation force; and
    wherein each of the first, second, third and fourth separation force in-track components is different from other of the first, second, third, and fourth separation force in-track components.

* * * * *